May 18, 1965      C. J. BADEWITZ      3,184,736
ATTITUDE SENSING BY AMPLITUDE COMPARISON OF MULTIPLE RADAR BEAMS
Filed Nov. 28, 1962      2 Sheets-Sheet 1

INVENTOR.
CHARLES J. BADEWITZ
BY *Knox & Knox*

May 18, 1965          C. J. BADEWITZ          3,184,736

ATTITUDE SENSING BY AMPLITUDE COMPARISON OF MULTIPLE RADAR BEAMS

Filed Nov. 28, 1962          2 Sheets-Sheet 2

INVENTOR.
CHARLES J. BADEWITZ
BY
*Knox & Knox*

United States Patent Office 3,184,736
Patented May 18, 1965

3,184,736
ATTITUDE SENSING BY AMPLITUDE COMPARISON OF MULTIPLE RADAR BEAMS
Charles J. Badewitz, San Diego, Calif., assignor to The Ryan Aeronautical Co., San Diego, Calif.
Filed Nov. 28, 1962, Ser. No. 240,609
7 Claims. (Cl. 343—5)

This invention relates generally to radar navigation and altimeter systems and particularly to a radar system for sensing vehicle attitude relative to a reflecting surface.

BACKGROUND

Various radar systems for determination of range, azimuth, speed, drift, and altitude are known to the art. Pulse, frequency modulation, and Doppler techniques applied to such systems also are well known. Some systems use a plurality of fixed beams while others sweep a single beam through known positions. In all radar systems, electromagnetic waves are reflected back to a radiation source by an object, one or more characteristics of the waves being used to indicate a specific quantity. Simple pulse radar, for example, uses the constant velocity of electromagnetic waves in space to measure range and a directional antenna to indicate azimuth from the source to an object. A system for measuring the speed and drift of an airborne vehicle may use two or more fixed beams or a single beam swept through two or more known positions; differences in characteristics of the reflected signals, then are used to compute ground speed and drift, the Doppler frequency shift being a frequently used characteristic.

The instant invention senses airborne vehicle attitude relative to a reflecting surface by comparing the amplitudes of three or more reflected signals originated by fixed beams or a single beam swept through three or more fixed positions.

This invention may be used as a single system or, more economically, by supplementary modification of an existing system that performs other functions.

OBJECTS

It is a principal object of this invention to provide a simple vehicle attitude sensing system that is readily adaptable to an existing system using a plurality of electromagnetic beams to perform other functions.

It is another object of this invention to provide an improved system for more effective detection of terrain irregularities.

The attitude sensing function may be used with other systems in manned or unmanned vehicles for detection of terrain dissimilarity, determination of whether the reflecting surface is level or not, check and calibration of other systems, and control of vehicle maneuvers.

With these and other objects definitely in view, this invention consists in the novel combination and arrangement of elements as will be hereinafter fully described in the specification, particularly pointed out in the claims, and illustrated in the drawings that form a material part of this disclosure, and of which:

Figure 3:
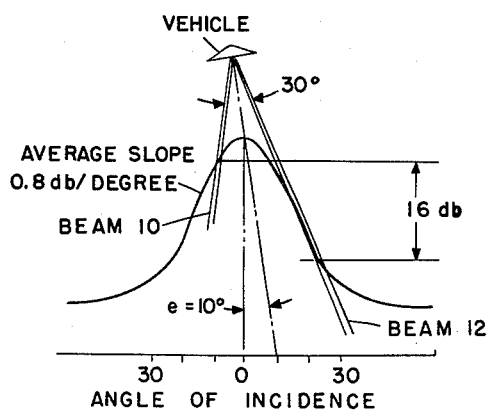

FIGURE 3 compares the reflectivity of two beams at different angles of incidence.

Figure 4:
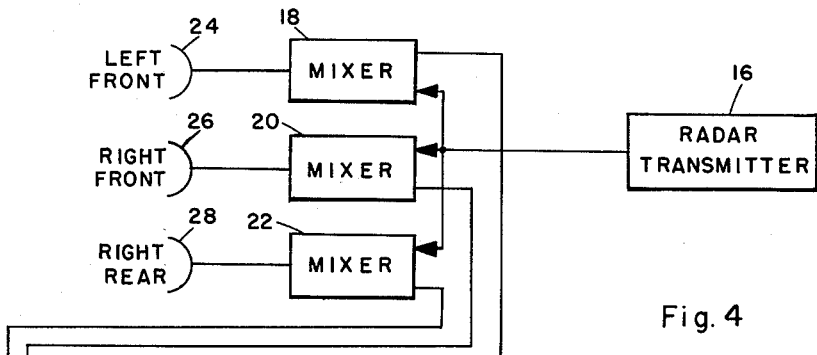

FIGURE 4 is a block diagram of an embodiment using three fixed beams.

Figure 5:
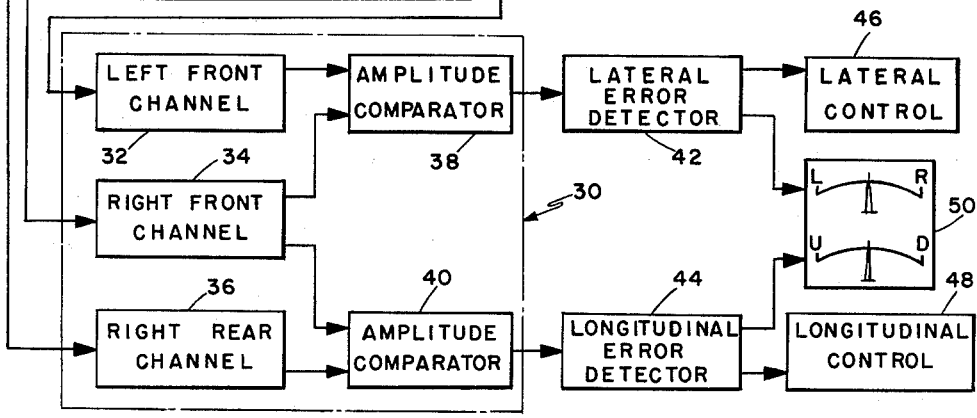
Figure 5:
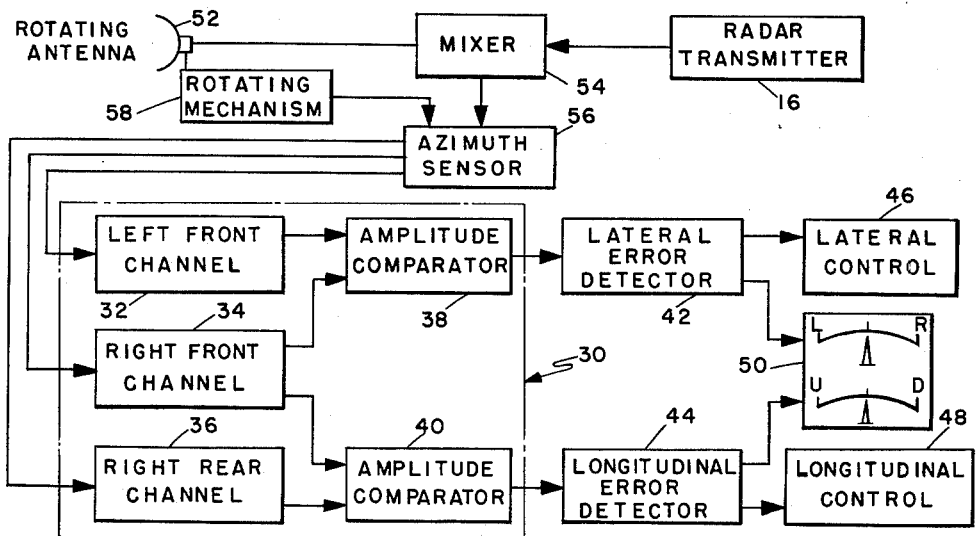

FIGURE 5 is a block diagram of an embodiment using a single swept beam.

DETAILED DESCRIPTION

Figure 1:
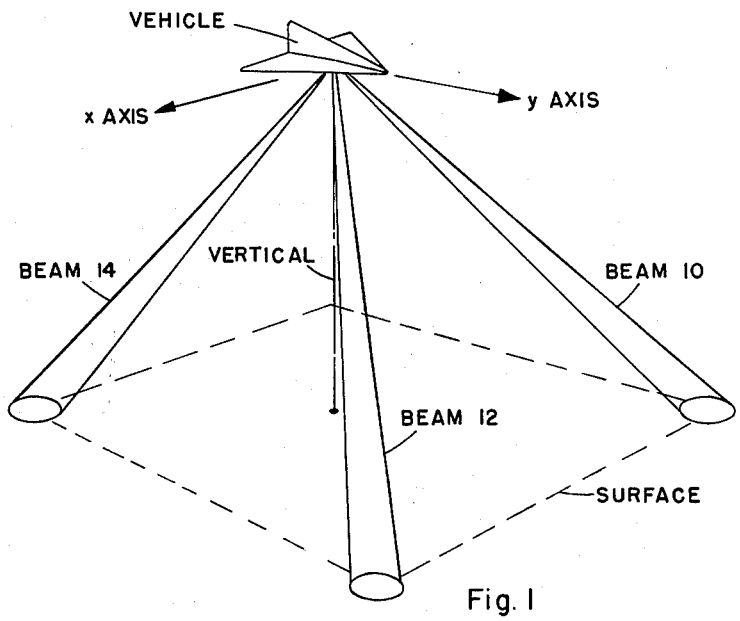
FIGURE 1 shows the vehicle beam relationship.

In FIGURE 1, three fixed beams are shown directed in a downward direction in different quadrants at the same angle relative to the longitudinal and transverse axes of a vehicle. Two beams 10 and 12 are oriented forward and to the left and right of the vehicle's longitudinal axis. A third beam 14 is oriented rearward and to the right of the longitudinal axis of the vehicle. The same presentation also could be used to illustrate three momentary positions of a single, swept beam.

When the reflecting surface and the vehicle's flight attitude are level, the angles of incidence of the three beams are equal, the lengths of the three beams are equal, and the amplitudes of the three reflected beams are equal, assuming reflectivity of the reflecting surface is uniform. Under these conditions, deviations from level flight change the angles of incidence, lengths, and relative amplitudes of the beams, reflected beams 10 and 12 indicating transverse angular errors relative to the vehicle's longitudinal axis and reflected beams 12 and 14 indicating longitudinal angular errors relative to the vehicle's transverse axis. In conventional aircraft, a difference in amplitude between beams 10 and 12 indicates the wings are not level requiring right or left control stick aileron correction; and a difference in amplitude between beams 12 and 14 indicates the fuselage is not level, requiring up or down control stick elevator correction.

Figure 2:
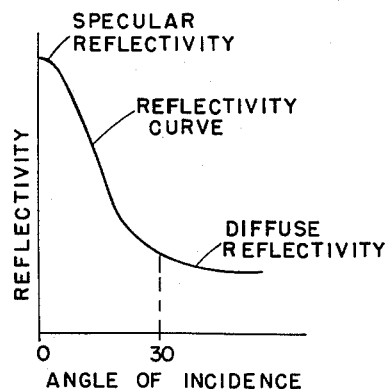
FIGURE 2 is a reflectivity curve plotted against beam angle of incidence.

FIGURE 2 shows the reflectivity of a uniform reflecting surface, indicating maximum reflectivity at zero angle of incidence, dropping sharply to an inappreciable magnitude at 30 degrees and above. In accordance with this reflectivity characteristic, a reflected beam rotating toward the vertical increases in amplitude, while a reflected beam rotating away from the vertical decreases in amplitude.

In FIGURE 3, a vehicle is shown in a flight attitude 10 degrees from the vertical or level flight. In conventional aircraft, the left wing would be down with beam 10 rotated transversely about the longitudinal axis toward the vertical, and the right wing would be up with beam 12 rotated transversely about the longitudinal axis away from the vertical. The two beams plotted against a reflectivity response curve indicate a 16 db difference in amplitude.

Since a 3 db change is detectable by the average human ear and changes of lower magnitude are detectable by sensitive instruments, the method of the instant invention provides a sensitive detector of vehicle attitude changes. Changes in terrain contours and surface reflectivity also are readily detected.

In one embodiment of this invention, as illustrated in FIGURE 4, fixed antenna beams are employed. Radar transmitter 16 couples energy through mixers 18, 20 and 22 to fixed, directional antennas 24, 26 and 28. Antennas 24 and 26 radiate sharply defined beams forward and downward, one to the left and the other to the right of the vehicle's longitudinal axis. Antenna 28 performs a similar function rearward, downward, and to the right. Antenna 28 could be directed to the left with no change in system performance. The coupled energy from transmitter 16 may have any characteristic known to the art, and antennas 24, 26 and 28 may be energized simultaneously or sequentially. Reflected energy is received by antennas 24, 26 and 28 and coupled by mixers 18, 20 and 22 to radar receiver 30. Signals from the three antennas are kept separated in receiver channels 32, 34 and 36 and compared in amplitude comparators 38 and 40. Amplitude comparator 38 compares signals from the two forward antennas, while amplitude comparator 40 compares signals from the right forward and rearward antennas. When the signal amplitudes are equal, amplitude comparators 38 and 40 have no output.

When the amplitudes of signals fed to amplitude comparator 38 are unequal, the difference signal is fed to lateral error detector 42. Similarly, a difference signal output of amplitude comparator 40 is fed to longitudinal error detector 44. In either case, the error signal is either positive or negative. If the error signal is used to control flight attitude, the lateral error signal is fed to lateral or similar control 46 and the longitudinal error signal is fed to longitudinal or similar control 48. In both cases, the effect of the error signal restores the vehicle to level flight. The error signals may also be fed to error indicator 50 in which transverse errors are shown to left or right indicating the left or right forward beam amplitude is greater, and longitudinal errors are shown up or down indicating the right forward or rearward beam amplitude is geater. These indications, by comparison with the indications of other systems, may be used to indicate terrain that is uneven in contour or reflectivity or a reflecting surface that is not level.

A second embodiment, shown in FIGURE 5, uses a rotating antenna to sweep a beam continuously through 360 degrees at a downward angle corresponding to that of the fixed beams in the first embodiment. Radar transmitter 16 energizes rotating, directional antenna 52 through mixer 54. Antenna 52, thus, radiates energy through 360 degrees. Alternatively, radar transmitter 16 could be timed to energize antenna 52 only when the antenna is oriented momentarily at selected azimuth points.

Reflected energy is received by antenna 52 through 360 degrees or, alternatively, at said selected azimuth points and coupled by mixer 54 to azimuth sensor 56. An additional signal from antenna rotating mechanism 58 to azimuth sensor 56 enables azimuth sensor 56 to reject all reflected energy except at azimuths corresponding to positions of the fixed beams in the first embodiment. As a result, reflected signals are fed by azimuth sensor 56 to radar receiver 30 with essentially the same characteristics as the signals of the fixed beams in the first embodiment. The signals are kept separated in channels 32, 34 and 36 and utilized in the same manner as in the first embodiment.

In conjunction with sensing vehicle attitude and terrain inconsistencies, this system may be used to provide vertical correction signals to other systems, such as gyros, artificial horizons, and inertial systems that are subject to drift or change from one reference object or system to another.

It is understood that minor variation from the form of the invention disclosed herein may be made without departure from the spirit and scope of the invention, and that the specification and drawing are to be considered as merely illustrative rather than limiting.

I claim:
1. A method of sensing vehicle attitude relative to terrain comprising the steps of:
    radiating electromagnetic beams in at least three different fixed downward directions relative to the normal attitude of the vehicle;
    receiving each beam reflected along the same path as radiated;
    comparing the amplitudes of the separate beams; and deriving from the comparative amplitudes the attitude of the vehicle relative to the terrain surface reflecting the beams.

2. The method of claim 1 in which at least two of said directions are forward to the left and right of the longitudinal axis of said vehicle, and at least one of said directions is rearward in the same longitudinal, inclined plane as one of the forward directions.

3. In a radar system for a vehicle including a transmitter and a receiver, the combination comprising:
    antenna means radiating signals in at least three different, fixed downward directions relative to the normal attitude of the vehicle, each radiated signal being reflected and received along the same path as radiated;
    means for sensing amplitude equality and difference between the reflected signals; and means for deriving from the comparative amplitudes the attitude of the vehicle relative to vertical.

4. In a radar system for a vehicle including a transmitter and a receiver, the combination comprising:
    antenna means radiating signals in at least two fixed downward, forward directions to the left and right of the longitudinal axis of said vehicle, and at least one fixed downward, rearward direction in the same longitudinal inclined plane as one of the forward directed antenna means, said directions being relative to the normal attitude of said vehicle;
    and amplitude comparator means for converting difference in amplitudes of the forward directed reflected signals into transverse attitude error signals and converting difference in amplitudes of the forward and rearward directed signals in the same longitudinal inclined plane into longitudinal attitude error signals.

5. Apparatus according to claim 4 in which said antenna means includes directional antennas which are fixed relative to the vehicle.

6. Apparatus according to claim 4 in which said antenna means includes a rotating, directional antenna and means for rejecting all reflected signals except those reflected from said directions.

7. Apparatus according to claim 4 and including means for correcting vehicle attitude with said error signals.

References Cited by the Examiner
UNITED STATES PATENTS

| | | | |
|---|---|---|---|
| 2,412,003 | 12/46 | Neufeld | 343—7 |
| 2,499,349 | 3/50 | Ayres | 343—7 |
| 2,965,894 | 12/60 | Sweeney | 343—7 |
| 2,987,026 | 6/61 | Cunningham | 343—7 |
| 3,028,592 | 4/62 | Parr et al. | 343—7 |
| 3,090,583 | 5/63 | Behun et al. | 343—100 |
| 3,095,562 | 6/63 | Dworetzky et al. | 343—8 |
| 3,102,263 | 8/63 | Meyer | 343—8 |

CHESTER L. JUSTUS, *Primary Examiner.*